Feb. 14, 1933.  S. F. GLEASON  1,897,899
COOKING UTENSIL
Filed June 13, 1931   13 Sheets-Sheet 3

Inventor:
Stanley F. Gleason
by his Attorneys
Howson & Howson

Feb. 14, 1933.   S. F. GLEASON   1,897,899
COOKING UTENSIL
Filed June 13, 1931   13 Sheets-Sheet 5

Inventor:
Stanley F. Gleason
by his Attorneys
Howson & Howson

Feb. 14, 1933.   S. F. GLEASON   1,897,899
COOKING UTENSIL
Filed June 13, 1931   13 Sheets-Sheet 7

Feb. 14, 1933. S. F. GLEASON 1,897,899
COOKING UTENSIL
Filed June 13, 1931 13 Sheets-Sheet 8

Feb. 14, 1933.  S. F. GLEASON  1,897,899
COOKING UTENSIL
Filed June 13, 1931  13 Sheets-Sheet 9

Feb. 14, 1933.　　S. F. GLEASON　　1,897,899
COOKING UTENSIL
Filed June 13, 1931　　13 Sheets-Sheet 10

Feb. 14, 1933.  S. F. GLEASON  1,897,899
COOKING UTENSIL
Filed June 13, 1931   13 Sheets-Sheet 11

Inventor:
Stanley F. Gleason
by his Attorneys
Howson & Howson

Inventor:
Stanley F. Gleason
by his Attorneys
Howson & Howson

Feb. 14, 1933.  S. F. GLEASON  1,897,899
COOKING UTENSIL
Filed June 13, 1931  13 Sheets-Sheet 13
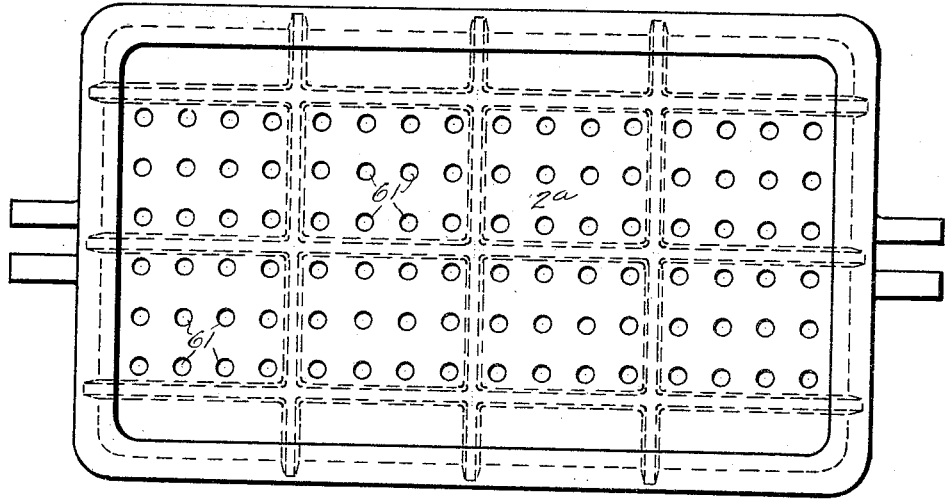
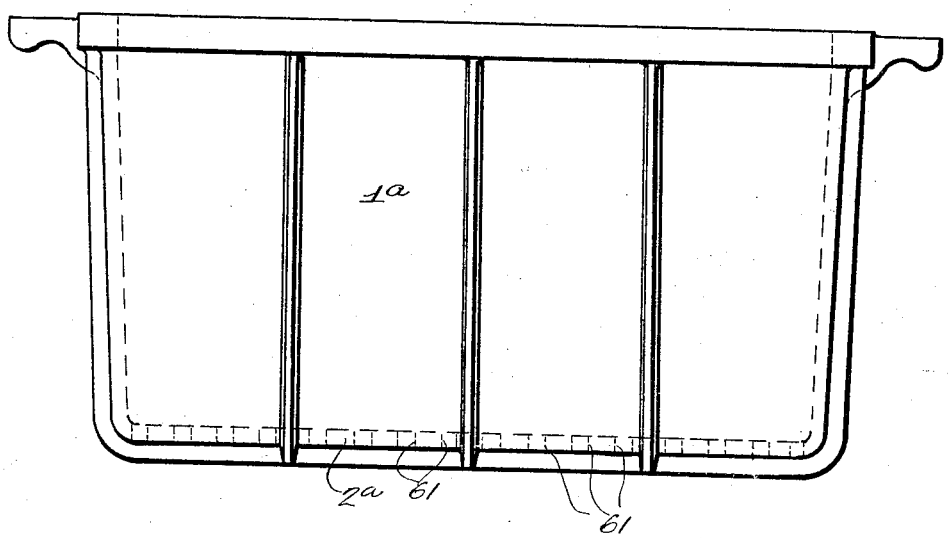

Patented Feb. 14, 1933

1,897,899

UNITED STATES PATENT OFFICE

STANLEY F. GLEASON, OF PHILADELPHIA, PENNSYLVANIA

COOKING UTENSIL

Application filed June 13, 1931. Serial No. 544,172.

This invention relates to utensils adapted for use in the cooking of hams and other meat products, as effected in the meat-packing industry, and particularly to utensils of the type wherein the product is maintained in a compressed state constantly throughout the cooking period in order to mold the product into a predetermined shape and to prevent disintegration of the product during the cooking thereof.

One object of the invention is to provide a cooking utensil of this type with a novel form of compressing means whereby the pressure exerted upon the product within the utensil may be manually regulated prior to the cooking operation and automatically increased as the cooking of the product progresses to counteract the tendency of the product to expand as its temperature rises.

Another object of the invention in the case of completely closed utensils is to provide a breather in communication with the interior of the utensil to permit undesirable gases which may emanate from the product during the cooking thereof to pass freely from the product and from the interior of the utensil, whereby the natural flavor of the product will be maintained.

Another object of the invention is to provide utensils of the above-mentioned types with safety means to prevent breakage or distortion of any of the parts of the utensil as may be caused by excessive expansion of the product being compressed and cooked in the utensil.

Other objects and advantages and the construction and operation of the device in detail will be fully disclosed hereinafter, reference being had to the accompanying drawings, of which:

Figs. 16 and 17 are respectively plan and side elevation of the pan shown in Figs. 4 and 5.

Figure 1:
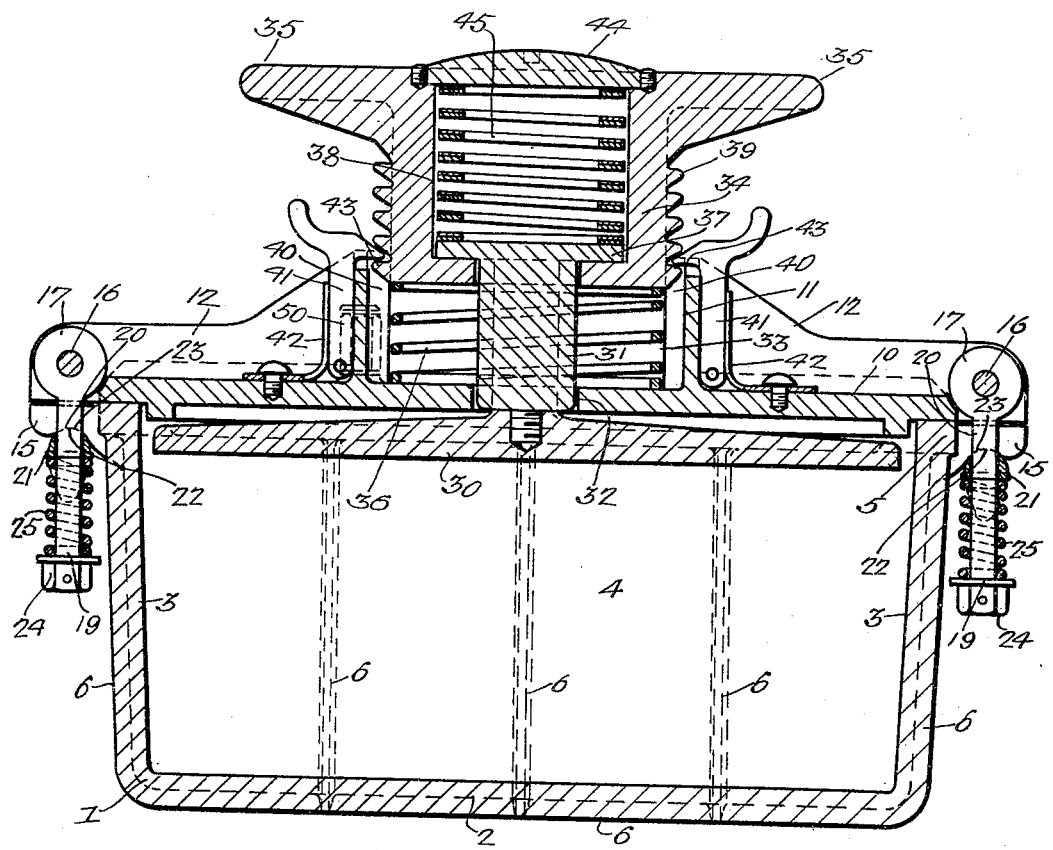
Fig. 1 is a longitudinal sectional elevation of a completely closed utensil constructed in accordance with the principles of the present invention.
Figure 2:
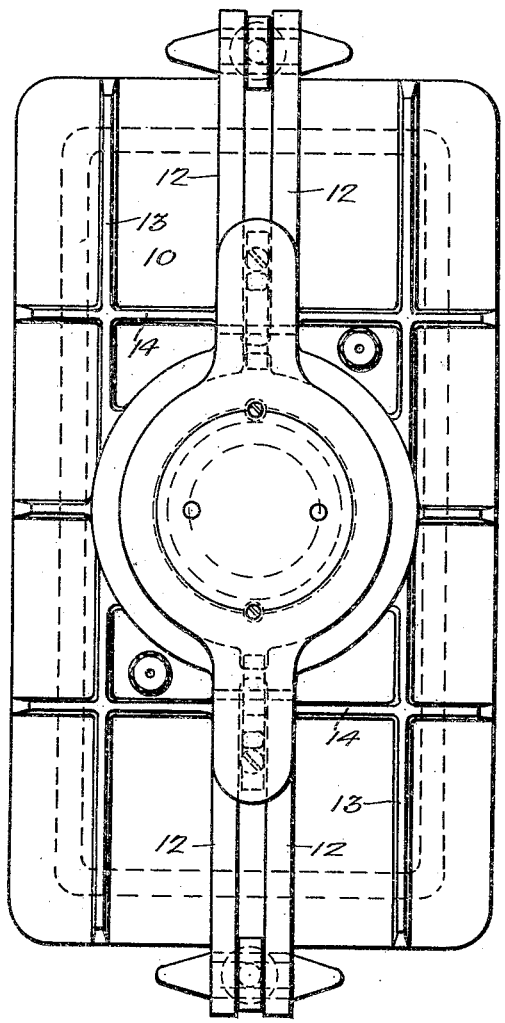
Figs. 2 and 3 are respectively a plan and end elevation of the device shown in Fig. 1.
Figure 3:
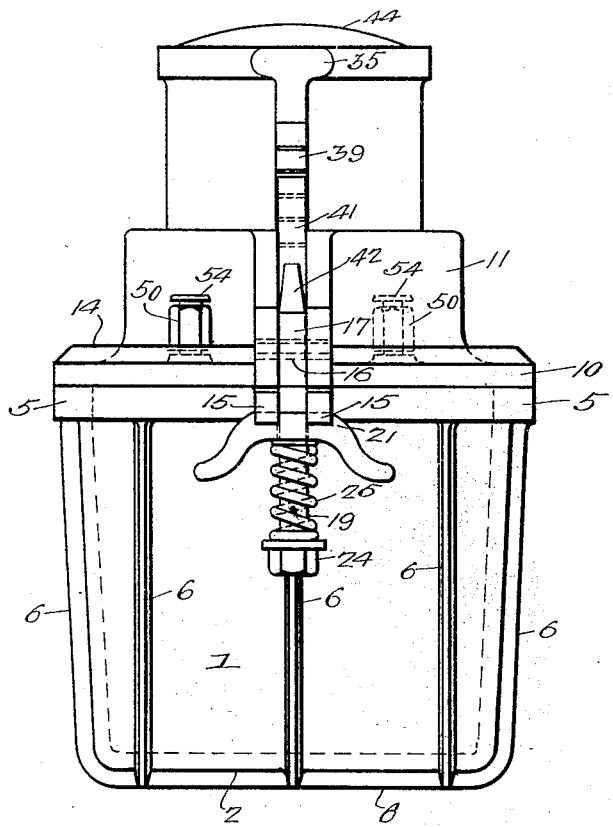

In the preferred form of the invention shown in Figs. 1, 2 and 3, the utensil comprises a suitable pan 1 comprising a bottom 2, end walls 3, 3 and side walls 4, 4. The pan is preferably constructed of cast aluminum, and is provided with a reinforcing rim 5 extending completely around the open top of the pan 1 while the bottom, end and side walls are provided with suitable reinforcing ribs 6 which join with the top rim 5 in order that the utensil may withstand considerable internal pressure.

In the form of the invention illustrated in Figs. 1, 2 and 3, the open top is closed by a cover 10 comprising a plate which rests on the top edges of the pan and extends to the outer edge of the rim 5 completely around the pan 1.

Centrally disposed and extending upwardly from the cover plate 10 is a cylindrical wall 11 and extending longitudinally of the cover and outwardly from the cylindrical wall 11 toward and beyond the opposite ends of the cover plate 10 are laterally spaced ribs 12, 12.

The top plate 10 is further reinforced by longitudinal ribs 13 and transverse ribs 14.

Extending outwardly from each of the end walls 3 and in planes coinciding with planes of the ribs 12 are laterally spaced ears 15, 15.

Pivotally mounted on transversely extending pins 16, 16 intermediate the ribs 12, 12 are heads 17, 17 from which depend shanks 19, 19 of clamp bolts 20 which pass between the ears 15, 15.

Slidably mounted on the shanks 19, 19 are handles 21, 21 which are provided with curved upper surfaces 22, 22 which are adapted to fit within sockets 23, 23 formed in the undersides of the ears 15, 15. Encircling the shanks 19, 19 between the lower sides of the handles 21, 21 and retaining nuts 24, 24 on the lower ends of said shanks are compression springs 25, 25 which, when the cover 10 is in place on the pan 1, draw the cover plate tightly down into contact with the upper surface of the pan to completely close the pan. Obviously, internal pressure developing within the closed utensil to a point beyond the predetermined yielding point of the springs 25 will effect raising the cover 10 to relieve the pressure within the closed utensil.

Carried by the cover 10 and disposed within the pan 1 substantially parallel to the bottom 2 thereof is a compression plate 30, between which and the bottom and walls of the pan the meat or other product to be cooked is pressed.

Secured to and extending upwardly from the pressure plate 30 is a stud 31 which passes through a suitable opening 32 formed in the plate 10 and through the cylindrical cavity 33 formed by the cylindrical wall 11 on the upper side of the plate 10.

Slidably mounted in the cavity 33 is a cylindrical manually operable pressure head 34 having laterally extending arms 35, 35 by which the head 34 may be manually raised or lowered within the cavity 33.

Disposed within the cavity 33 between the upper side of the cover plate 10 and the underside of the pressure head 34 is a coiled spring 36 which tends to raise the head 34 within the cavity 33, vertical movement of the head 34 with respect to the cover plate 10 being limited by a flange or head 37 formed on the upper end of the stud 31 and disposed within a cylindrical cavity 38 formed in the head 34. The head 34 is provided with a series of laterally extending vertically spaced lugs 39 which project into suitable grooves 40 formed in the inside of the cylindrical wall 11 whereby rotation of the head 34 with respect to the cover plate 10 is prevented.

Pivotally mounted at opposite sides of the head 34, intermediate the longitudinal ribs 12, 12, are latches 41, 41 respectively, which are pressed toward the head 34 by springs 42, 42, the latches 41 having shoulders 43, 43 co-operating with the lugs 39 of the head 34 to retain the head 34 in a predetermined position with respect to the cover plate 10 when said head is forced downwardly in the cavity 33 against the action of the spring 36 in said cavity, the latches 41 functioning as detents to retain the head in a position to which it may be manually adjusted with respect to the cover plate 10. The cavity 38 in the head 34 is closed by a suitable closure plate 44 and disposed between the said closure plate 44 and the upper side of the head 37 of the stud 31 is a compression spring 45, through the medium of which the plate 30 will be forced down into pressing contact with the product contained within the pan 1 when the head 34 is lowered with respect to the cover plate 10.

Figure 13:
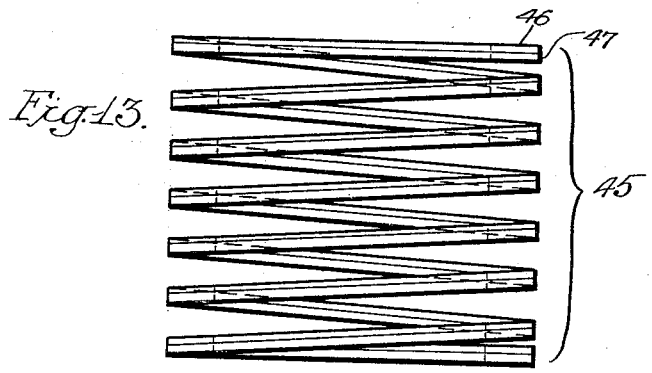
Fig. 13 is an enlarged detail view of the automatic pressure-regulating means shown in Fig. 1.

For purposes hereinafter noted, the spring 45, as shown in Figs. 1 and 13, is composed of two strips of metal 46 and 47 respectively which have different co-efficients of expansion, the two strips being rigidly secured together and comprising what is commonly known as a bi-metallic strip, the purpose of which is to effect the flexing of the combined strip when the strip is subjected to temperature above that at which the two strips normally assumed parallel planes.

The utensil shown in Figs. 1, 2 and 3 is adapted for use in the roasting of meats particularly, the meat being placed in the pan 1 and the cover 10 being applied thereto with the locking elements 20, 20 in operative positions to hold the cover 10 tightly down on the pan 1. The head 34 is then manually lowered against the action of the spring 36 which, through the bi-metallic spring 45 and stud 31, forces the pressure plate 30 into pressing contact with the meat contained within the pan 1, the latches 41, 41 maintaining the elements in the said relative positions. In this way the initial pressure on the product contained within the pan 1 is manually regulated. The pan is then placed in a suitable cooking apparatus, such as an oven, and as the temperature of the utensil and the contained product rises the product has a tendency to expand, as in the case of meats which contain relatively high percentage of moisture.

The expansion of the meat between the bottom 2 of the pan 1 and the pressure plate 30 tends to raise the said plate 30 against the action of the bi-metallic spring 45, and due to the increased temperature of the device the bi-metallic spring 45, due to the tendency of the strip of which the spring is composed to warp or flex in the manner above noted, causes the spring 45 to effect an increase in the pressure exerted by said spring between the closure plate 44 and the head 37 of the stud 31 which counteracts the expansion of the meat and forces the plate 30 down more tightly against the meat which eliminates any tendency of the meat to disintegrate during the cooking operation and forces the gases which form within the meat by the heating thereof out of the meat into the interior of the container.

Figures 14, 15:
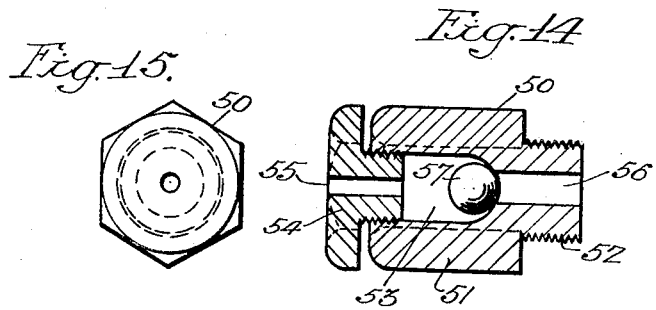
Fig. 14 is a sectional elevation of the breather valve shown in Figs. 1, 2 and 3.
Fig. 15 is a plan view of the valve shown in Fig. 14.

In order to evacuate these undesirable gases from the interior of the container to preserve the natural flavor of the meat the utensil is provided with one or more breathers 50, such as are illustrated in detail in Figs. 14 and 15, each breather comprising a body 51 having a shank 52 threaded into a suitable opening formed in the cover plate 10, the body being provided with a cavity 53 closed by a suitable plug 54 having an aperture 55 affording communication between the atmosphere outside the container and the interior of the cavity 53, the shank 52 being provided with an aperture 56 affording communication between the cavity 53 and the interior of the utensil.

Within the cavity 53 is loosely mounted a ball 57 which, with the valve disposed in the position with its axis arranged vertically, seats on the mouth of the aperture 56 within the cavity 53 and functions as a check-valve whereby the gases within the utensil may freely pass outwardly from the container through the opening 56 and unseating the valve 57 passing into the cavity 53 and thence outwardly therefrom in the opening 55 of the plug 54, seating of the valve 57 preventing movement of fluids of any kind in an opposite direction into the interior of the container.

Figure 4:
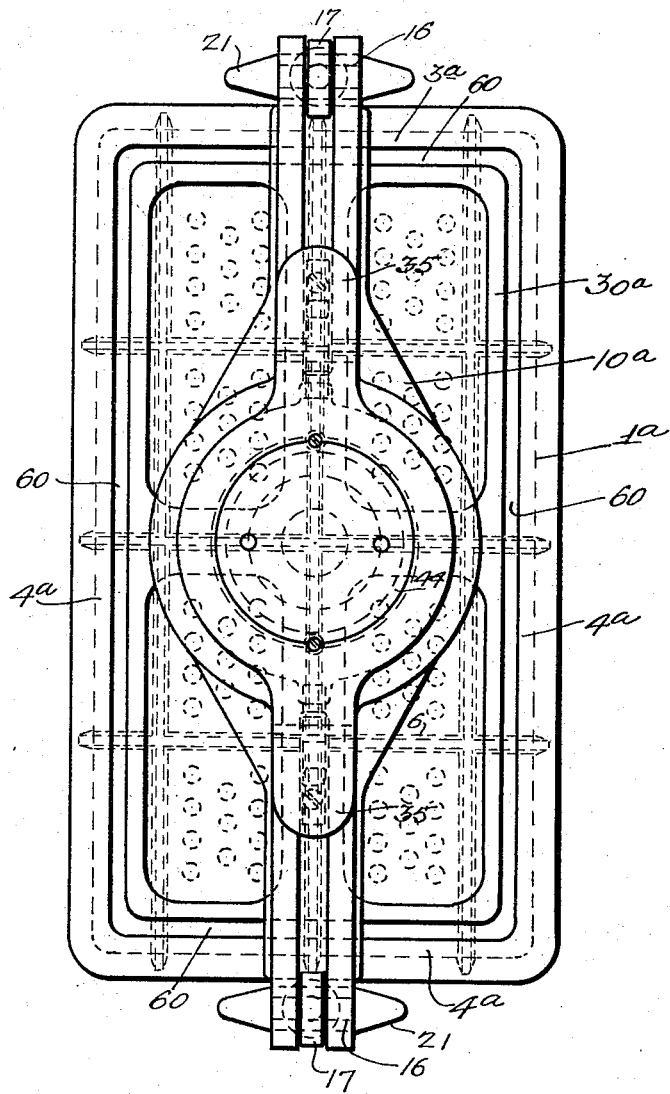
Fig. 4 is a plan view of a partially open utensil.
Figure 5:
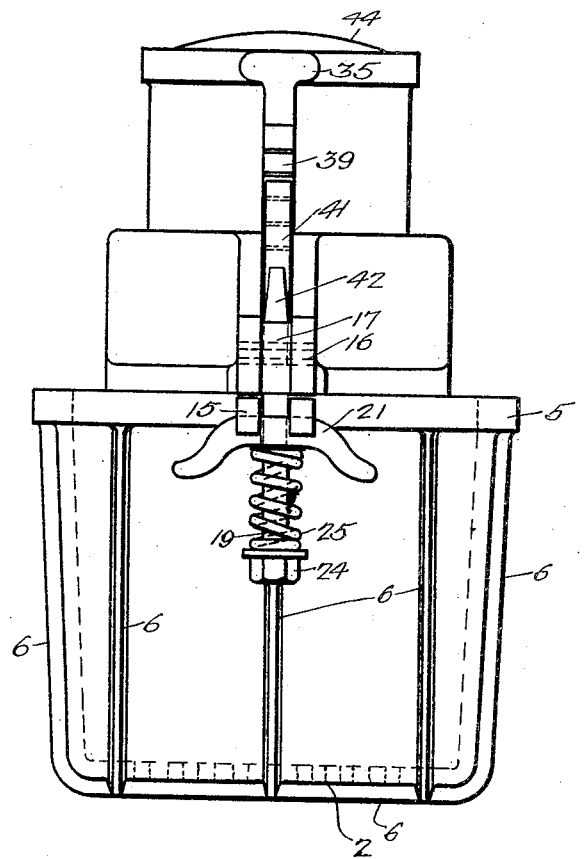
Fig. 5 is an end elevation of the device shown in Fig. 4.

The utensil shown in Figs. 4 and 5 is adapted for use in the boiling of meat products, such as hams, and for this purpose is but partially closed, it being noted upon referring to Figs. 4 and 5 that the cover plate is replaced by a bridge element 10a which functions to support the manually operable pressure head 34 in substantially the same manner in which this element is supported by the cover plate 10 in the form of the device shown in Figs. 1, 2 and 3.

As shown in Fig. 4, the pressure plate 30a is smaller than the opening in the top of the pan 10a, providing the space 60 extending completely around the pressure plate 30a and the inside of the end and side walls 3a and 4a respectively of the pan 1a providing for the passage of the cooking fluid to the meat within the pan 1a.

As shown in Figs. 4, 5, 16 and 17, the bottom 2a of the pan 1a is provided with a series of openings or perforations 61 by which the cooking medium in which the utensil is submerged may contact with the contents of the utensil. In this case, as in the case previously described with respect to Figs. 1, 2 and 3 of the drawings, the manual and automatic regulation of the pressure upon the meat contained within the pan is effected as and for the purposes above noted. The pan being more or less open in the instance shown in Figs. 4 and 5 obviates the necessity of providing breathers 50.

Figure 6:
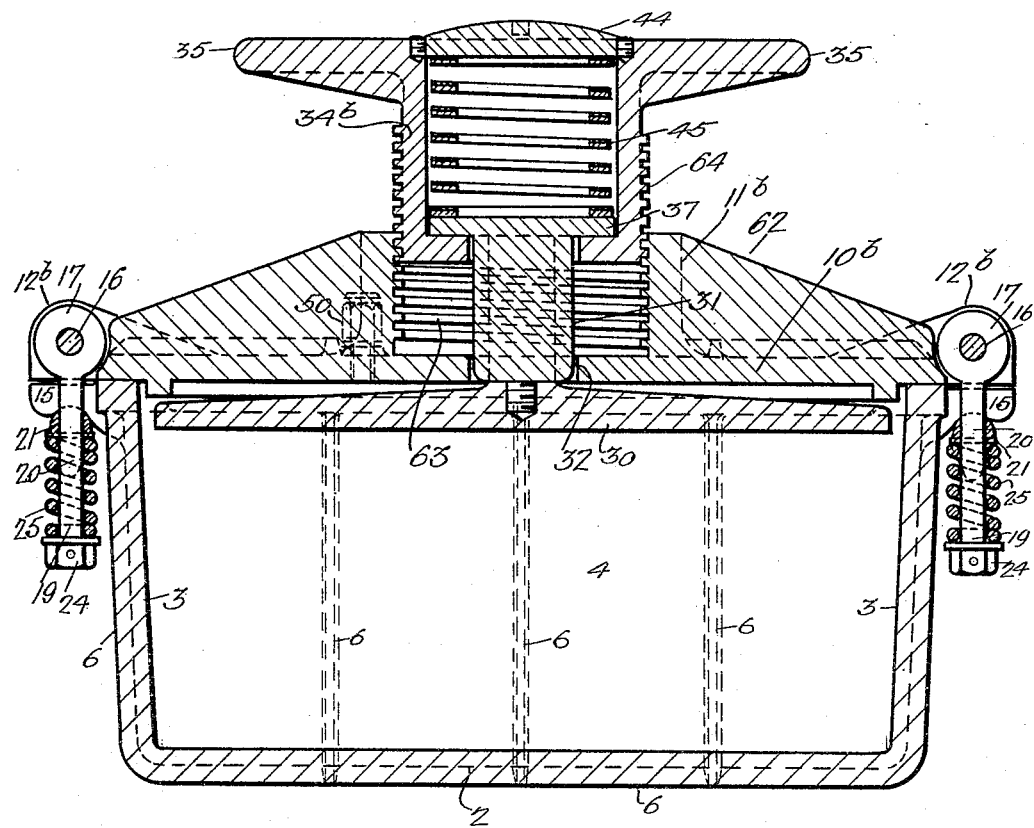
Fig. 6 is a view similar to Fig. 1, but showing a modified form of compression-regulating means.
Figure 7:
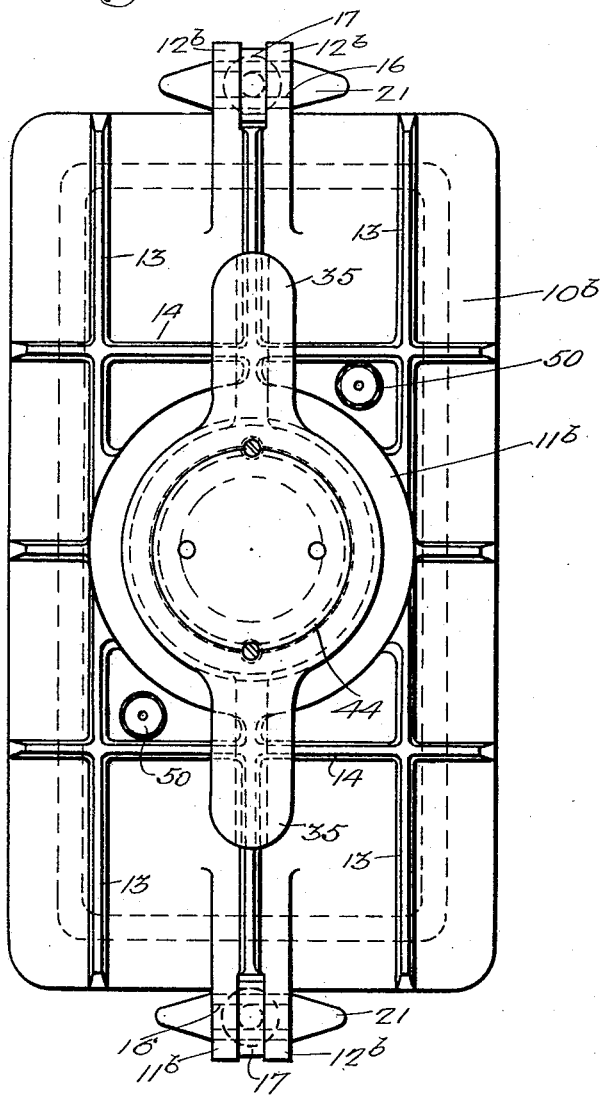
Figs. 7 and 8 are respectively a plan and end elevation of the device shown in Fig. 6.
Figure 8:
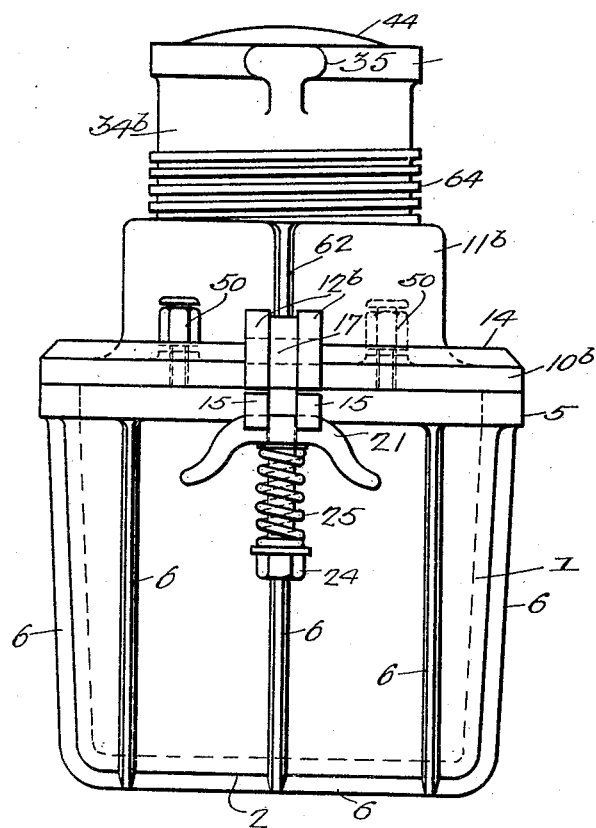

The form of the device shown in Figs. 6, 7 and 8 is substantially the same as that illustrated in Figs. 1, 2 and 3, with the exception of the means by which the initial manually applied pressure is exerted. In this instance the cover plate 10b is provided with a single longitudinally extending rib 62 which lies intermediate the laterally extending ears or lugs 12b between which the securing means 20 is pivotally mounted. The cover 10b is provided with a cylindrical boss 11b provided with internal threads 63 which co-operate with external threads 64 formed on the outside of the cylindrical pressure head 34b, whereby the initial pressure is applied by rotating the pressure head 34b with respect to the cover plate 10b, the threads 63, 64 co-operating to move the head 34 downwardly toward the cover plate 10b as and for the purposes above described with respect to the construction shown in Figs. 1, 2 and 3.

Figure 9:
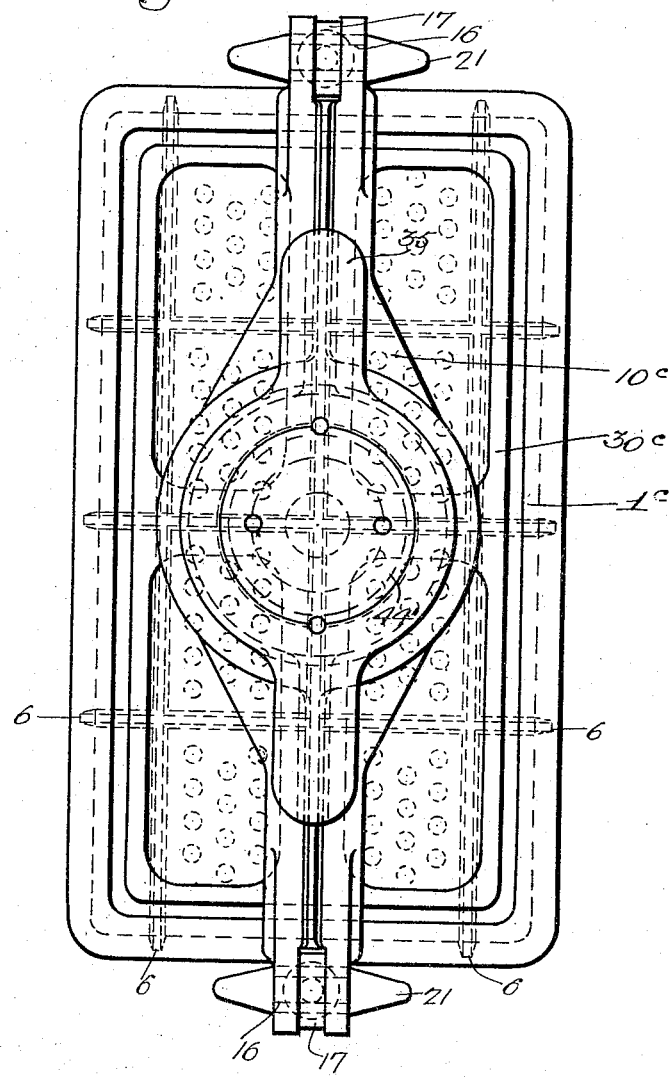
Figs. 9 and 10 are respectively a plan and end elevation of a utensil of the type shown in Fig. 4, and utilizing the compression-regulating means illustrated in Fig. 6.
Figure 10:
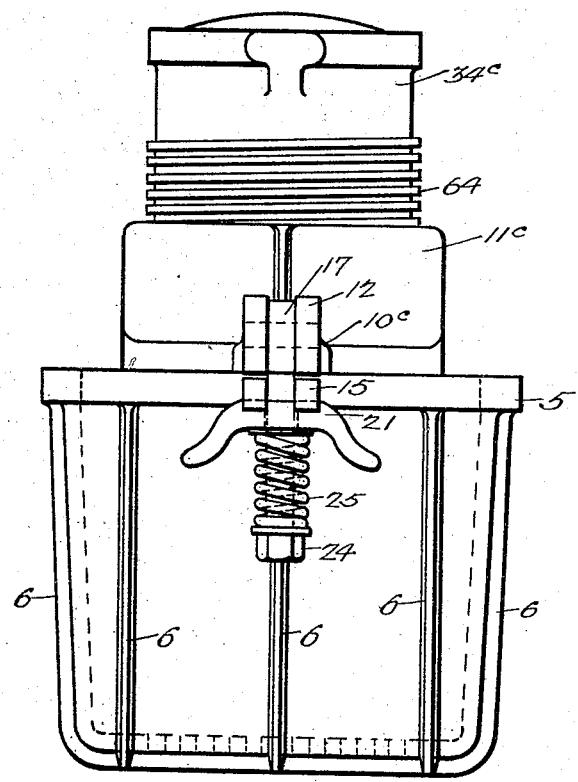

The device shown in Figs. 9 and 10 correspond to the form of device shown in Figs. 4 and 5, that is a partially closed container wherein the pressure plate 30c is of lesser area than the opening in the top of the container 1c and the pressure-applying means is carried by a bridge element 10c in place of a complete closure lid, such as that shown in Figs. 1, 2 and 3. In the instance shown in Figs. 9 and 10, the bridge element 10c supports a pressure-applying means corresponding in detail to that shown in Figs. 6 and 7, wherein the head 34c is threaded into the boss 11c carried by the bridge element 10c.

Figure 11:
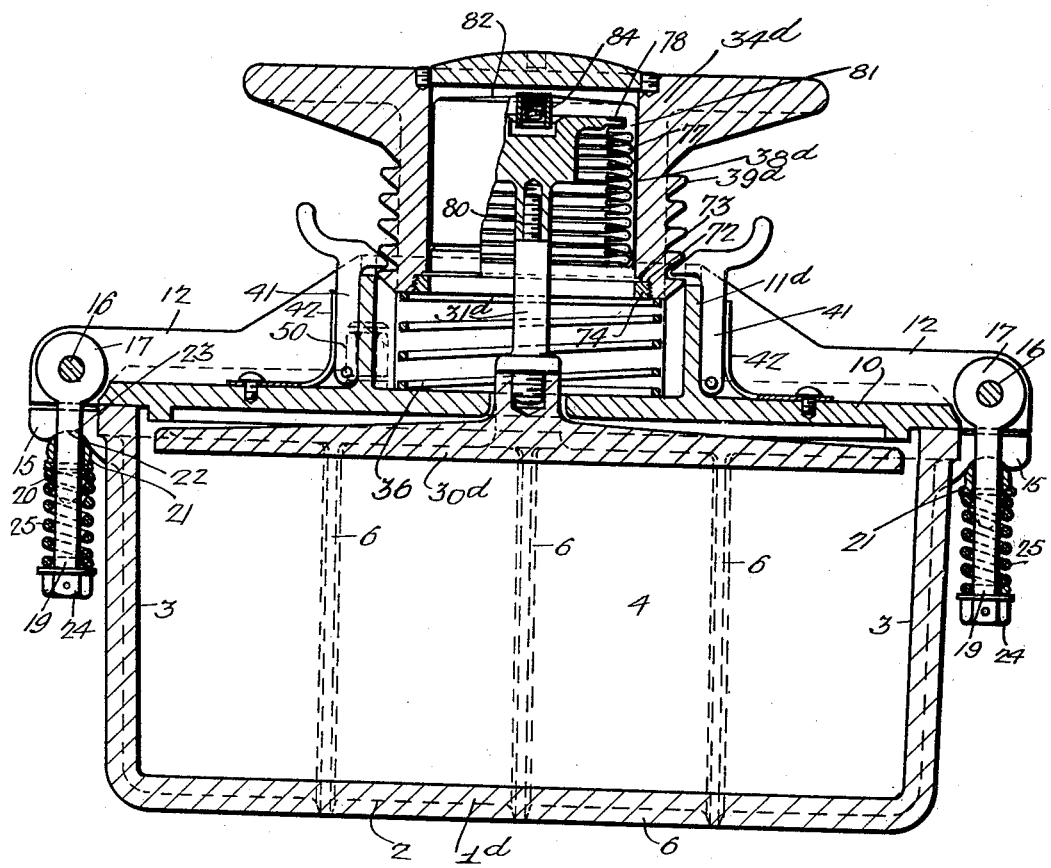
Fig. 11 is a longitudinal sectional elevation of a device of the type shown in Fig. 1 and illustrating a modified form of pressure-regulating means.
Figure 12:
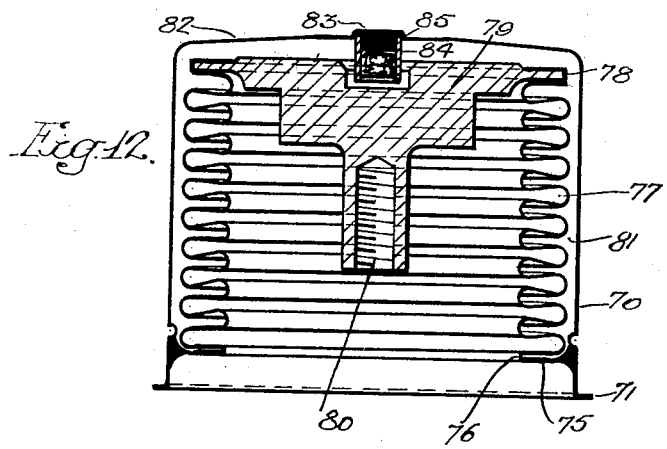
Fig. 12 is an enlarged sectional elevation of the pressure-regulating unit shown in Fig. 11.

The device shown in Fig. 11 is substantially the same as that shown in Figs. 1, 2 and 3, with the exception of the automatic pressure-regulating means which, as shown in detail in Fig. 12, comprises an outer casing 70 which is adapted to fit within the circular opening 38d in the manually operable pressure head 34d, the casing 70 being provided with a circular flange 71 which fits within an annular opening 72 formed in the head 34d between a shoulder 73 and a lock ring 74 threaded into the mouth of the cavity 72 and pressing the flange 71 into rigid contact with the shoulder 73. The casing 71 is provided with an internal flange 75, the inner edge 76 of which is integrally connected to one end of an axial longitudinally expansible and contractable element 77 comprising a plurality of interconnected annular undulations producing an accordion effect. The upper end 78 of the annularly corrugated element 77 is connected to a head 79 having a depending lug or boss 80 into which the upper end of the stud 31d is connected, the opposite end of said stud being connected to the pressure plate 30d. The space 81 between the inside of the wall of the casing 70 and the outside of the annularly corrugated element 77 and head 79 is adapted to be filled with any suitable expansible fluid or fluid metal which, when heated during the cooking operation, will create an internal pressure within the casing 70 and around the outside of the accordion element 77 tending to move the head 79 away from the crown 82 of the casing 70, thereby exerting the downward pressure on the pressure plate 30d to exert pressure upon the product within the pan 1d in the manner described above.

The filling of the space 81 is accomplished through an opening 83 provided by a tube 84 extending inwardly from the crown 82 and when said space is filled the opening 83 is adapted to be closed by an ordinary cork 85, for example, which is held in place by a metallic plug 86, such as solder, which completely closes the outer end of the opening 83.

From the above, it will be seen that the invention embraces a cooking utensil adapted for either roasting, baking, boiling or steaming of meat products while the product is maintained under compression and that the pressure is automatically increased as the temperature of the product increases, whereby the obnoxious gases created or liberated within the meat by the raising of the temperature thereof are expelled from the meat and in the case of the entirely closed utensil are expelled from the interior thereof to preserve the natural flavor of the product.

I claim:

1. The combination in a cooking utensil of a container for the product to be cooked, means for pressing said product within said container, and means for increasing the pressure exerted by said pressing means as the temperature of the utensil and the contained product increases during a cooking period.

2. The combination in a cooking utensil of a container for the product to be cooked, means for pressing said product within said container, and thermo-sensitive means for automatically increasing the pressure exerted by said pressing means as the temperature of the utensil and the contained product increases during a cooking period.

3. The combination in a cooking utensil of a container for the product to be cooked, a plate for pressing said product within the container, and thermo-sensitive means for pressing the plate against the product in the container.

4. The combination in a cooking utensil of a container for the product to be cooked, a plate for pressing said product within the container, thermo-sensitive means for pressing the plate against the product in the container, and manually operable means for initially pressing of the plate against the product.

5. The combination in a cooking utensil of a container for the product to be cooked, a plate for pressing said product within the container, thermo-sensitive means for pressing the plate against the product in the container, and a manually operable pressure head arranged to carry said thermo-sensitive means for initially pressing the plate against the product.

6. The combination in a cooking utensil of a container for the product to be cooked, a plate for pressing said product within the container, thermo-sensitive means for pressing the plate against the product in the container, a manually operable pressure head arranged to carry said thermo-sensitive means for initially pressing the plate against the product, and means for retaining the manually operable pressure head in said pressing position to maintain the initial pressure of the plate on the product.

7. The combination in a cooking utensil of a container for the product to be cooked, a plate for pressing said product within the container, thermo-sensitive means for pressing the plate against the product in the container, a manually operable pressure head arranged to carry said thermo-sensitive means for initially pressing the plate against the product, means for moving the pressure head in a direction to release the plate from the product, and means for retaining the manually operable pressure head in said pressing position to maintain the initial pressure of the plate on the product.

8. The combination in a cooking utensil of an open sided container for receiving the product to be cooked, a pressure plate disposed in the open side of said container and arranged to press the product therein, a thermo-sensitive element for pressing said plate against the product, and a support for said thermo-sensitive element extending across the said open side of the container.

9. The combination in a cooking utensil of an open sided container for receiving the product to be cooked, a pressure plate disposed in the open side of said container and arranged to press the product therein, a thermo-sensitive element for pressing said plate against the product, a manually operable pressure head carrying said thermo-sensitive element, and a support for said head extending across the open side of said container.

10. The combination in a cooking utensil of an open sided container for receiving the product to be cooked, a pressure plate disposed in the open side of said container and arranged to press the product therein, a thermo-sensitive element for pressing said plate against the product, a support extending across the open side of said container, a manually operable pressure head carried by and relatively movable with respect to said support and providing a support for said thermo-sensitive element, and means for operatively connecting said plate to said manually operable pressure head for operation by said head and the thermo-sensitive element carried thereby.

11. The combination in a cooking utensil of a container having an open side, a cover for completely closing the open side of said container, a pressure plate within the container for pressing a contained product, a thermo-sensitive element carried by said cover and operatively connected to said pressure plate, and means for yieldingly securing said cover to said container.

12. The combination in a cooking utensil of a container having an open side, a cover for completely closing the open side of said container, a pressure plate within the container, a manually operable pressure head carried by said cover, means for movably connecting said pressure head to said plate for movement therewith and for relative movement therebetween, and a thermo-sensitive pressure element carried by said head in cooperative relation to said plate.

13. The combination in a cooking utensil of a container, a pressure plate within said container, a manually operable pressure head operatively connected to said pressure head, and a resilient thermo-sensitive element disposed between the pressure head and the plate, for applying an initial pressure of the plate on a contained product as effected by movement of the said head relative to said container and for increasing said pressure as the temperature of said thermo-sensitive element increases during the cooking period.

14. The combination in a cooking utensil of a container, a pressure plate within the container, a manually operable pressure head operatively connected to said plate, and a spring interposed between the head and the plate for applying an initial pressure of the plate against a contained product upon relative movement of the head with respect to the container, said spring being composed of a bi-metallic thermo-sensitive strip for increasing said pressure during the cooking period as the temperature of the spring increases.

15. The combination in a cooking utensil of a container, a pressure plate in said container, a manually operable pressure head for applying initial pressure of said plate against a contained product, and a thermo-sensitive element interposed between the head and the plate and comprising a yieldable element disposed in a cavity containing an expansible fluid for increasing said plate pressure as the temperature of said fluid increases during the cooking period.

STANLEY F. GLEASON.